Patented May 7, 1940

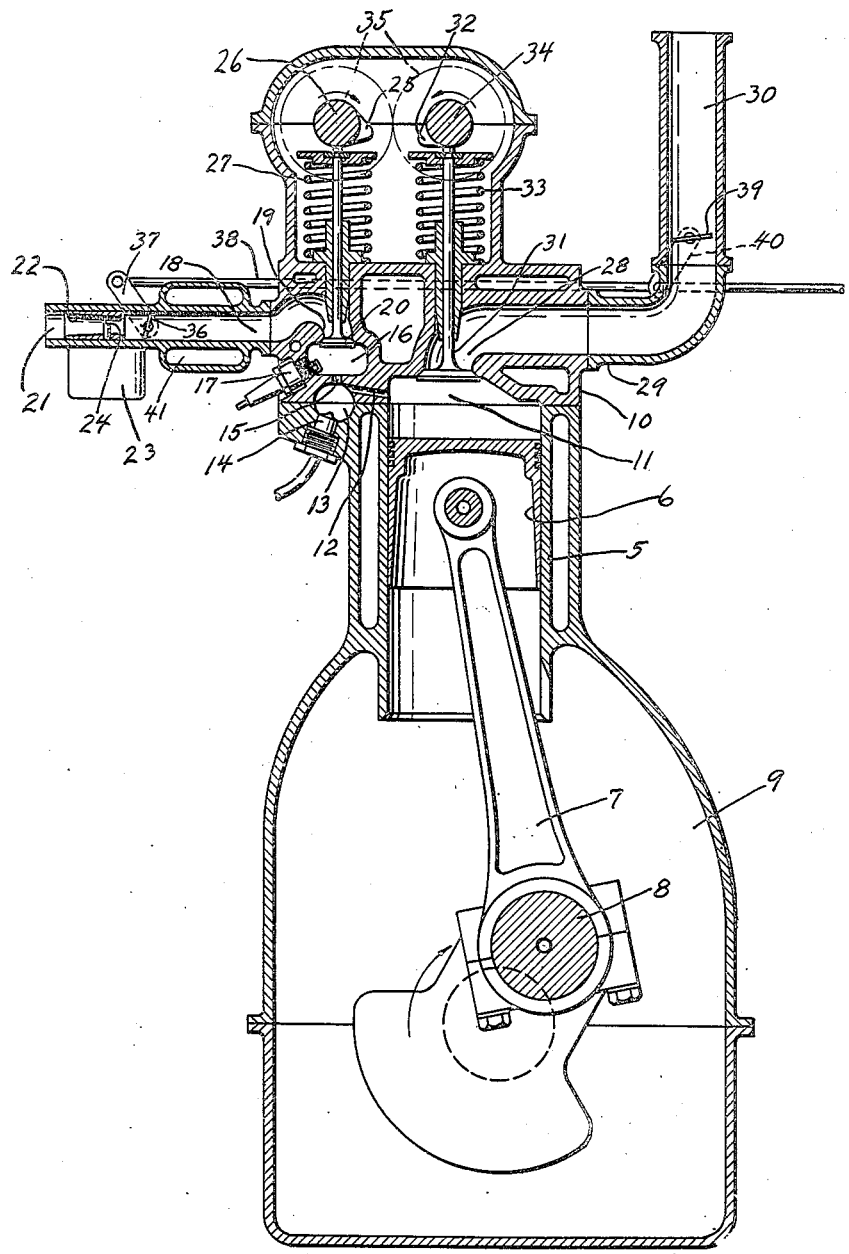

2,199,706

UNITED STATES PATENT OFFICE 2,199,706

INTERNAL COMBUSTION ENGINE

Marion Mallory, Detroit, Mich.

Application November 18, 1937, Serial No. 175,318

1 Claim. (Cl. 123—33)

This invention relates to improvements in an electrically ignited internal combustion engine in which the compression is comparatively high, but not high enough to rely on self or compression ignition for the sole timing.

In this engine, the spark plug is associated with a small primary ignition chamber or pocket which receives a carburetted mixture. This mixture, as it is ignited, is forced by its own expansion in the form of a flame through a highly restricted port into a second chamber or injection pocket at a time when injection has already started; thus igniting the injected fuel, causing it to continue to burn and expand to a high pressure, which forces it through a second highly restricted port into a main combustion chamber, which contains compressed air that increases the burning and expansion during the injection period.

The principal object of the invention is to retard the admission of fuel that enters the main combustion chamber so that the great pressure rise will take place after the crank pin has passed dead center. This eliminates or greatly reduces pre-ignition and detonation.

Another object of the invention is to control the ignition timing independently of injection pocket heat or compression heat.

A still further object is to segregate the idling charge from the main air charge during the suction stroke to maintain a mixture of the proper air and fuel ratio in the ignition pocket for idling and to ignite or start the burning of the injected mixture in the injection pocket. This makes it possible to admit a greater amount of air into the cylinder for idle and light loads than could be used in spark ignition injection engines, thereby maintaining a higher compression and better economy at part load operation.

The construction and operation of the invention will be more particularly explained in connection with the accompanying drawing, which is a vertical section taken centrally through one of the engine cylinders and the means for charging the same.

The drawing shows one of the engine cylinders 5 in which a piston 6 is reciprocable by means of a piston rod 7 connected with a crank shaft 8 operating in the usual manner in a crank case 9. It is to be understood that the engine may have any desired number of cylinders. The cylinder head 10 is formed above the cylinder 5 with a combustion chamber 11 connected by a highly restricted port 12 with an injector chamber or pocket 13 which is adapted to receive injections of liquid fuel from an injector 14. The injector pocket 13 also has a restricted inlet port 15 from a primary ignition chamber or pocket 16, which is provided with a spark plug 17.

An easily ignitable fuel mixture is supplied to the primary ignition pocket 16 from an intake manifold 18 through an inlet port 19, which is controlled by a valve 20. An air passageway 21 leads to the manifold 18 and is provided with a venturi 22, into which a carburetor 23 is adapted to discharge fuel through a nozzle 24. The valve 20 is adapted to be opened by a cam 25 disposed on a cam shaft 26, which is driven at one half crank shaft speed and is adapted to be closed by a spring 27.

Air is admitted to the cylinder 5 through an intake port 28 from a manifold 29, which has an air intake 30. The port 28 is controlled by an intake valve 31, which is adapted to be opened by a cam 32 and to be closed by a spring 33. The cam 32 is disposed on a shaft 34, which is connected by gearing 35 to the cam shaft 26 and rotates at the same speed. It will be understood that the main combustion chamber 11 is provided with the conventional exhaust port and valve, but the exhaust gases from the pockets 13 and 16, which are a negligible factor in the operation of the engine, are drawn into the cylinder during the intake stroke and there dissipated.

A throttle valve 36 is located in the intake passageway leading to the primary ignition pocket 16, between the nozzle 24 and the intake manifold 18, and is provided with an arm 37 to which the throttle rod 38 is connected. An air throttle valve 39 is located in the air intake passageway 30 and is provided with an arm 40 connected to the throttle rod 38. Thus the valves 36 and 39 open and close in synchronism and there will be a greater amount of mixture supplied to the pocket 16 when the throttle is opened. This charge is preferably sufficient for idling the engine, when the throttle is closed, without any injection from the injector 14. Thus a smooth idling is possible, which is not generally the case in a high compression engine. As the throttle valves are opened, there is an increasing amount of liquid injected into the pocket 13 and a corresponding increase of power.

While I have stated that easily ignitable fuel mixture is supplied to the pocket 16, it will be noted that there is a comparatively large heat chamber 41 around the manifold 18. It is possible, therefore, to use a heavy or inferior grade of fuel in the carburetor 23, as well as for the charge that is injected into the pocket 13, provided that some means is used to heat this heavy fuel to a point where it is easily ignited by the spark plug.

In the operation of this engine, the suction stroke of the piston will create a suction in the injection pocket 13 through the restriction 12 and this in turn will create a suction in the primary ignition pocket 16 through the restriction 15. A small amount of carburetted mixture, either gasoline or a highly heated low grade fuel, will be drawn into the pocket 16. Due to the size of restrictions 12 and 15 and ignition pocket 16, the latter will not be completely filled immediately. It will be necessary for the piston to travel to the end of its suction stroke, or nearly so, before the ignition pocket 16 will be completely filled. By this means, it can be seen that there will be little or no commingling of the mixtures of the pocket 16 with the air charge in the main combustion chamber. The exhaust gases will be drawn out of the injection pocket 13 and perhaps a small proportion of the mixture will be drawn into the pocket 13, but this will not be detrimental.

The spark is timed to occur in the pocket 16 as the piston nears the end of its compression stroke. The resulting explosion and high pressure causes a flame to be projected at a high velocity into the injection pocket 13. The injection of liquid fuel into the pocket 13 is timed to start a little in advance of the spark in the pocket 16. In other words, the injection will be taking place in the pocket 16 shortly before and during the time of the explosion in the pocket 13. At this time, there will be little, if any, mixture in the main combustion chamber 11 or in the cylinder.

As soon as the primary explosion occurs, a flame is projected into the injection pocket 13. The injection mixture starts to burn, but since the chamber 13 has a highly restricted outlet, the expanding mixtures, due to burning, will force this rich mixture, while it is on fire, into the compressed air of the main combustion chamber 11. Due to lack of air in the chamber 13, the mixture will be very rich and will therefore burn slowly, but when forced or liberated into the main combustion chamber, where there is more air, the expansion of the rich mixture will be greatly increased, exerting a powerful force against the piston. The injection continues and the burning continues until the piston is past dead center on the power stroke.

This operation might be considered as that of an electrically ignited Diesel engine. By this I mean that the timing of the fuel injection in my engine is about the same as in a Diesel, but instead of relying upon pressure for ignition, the carburetted mixture is ignited by an electric spark and by its explosion ignites the injected charge, at the same time forcing the latter by expansion into the main combustion chamber. Of course, the compressions are not as high as in a true Diesel engine, because it is my desire to avoid such excessively high compression, which makes the manufacturing difficult. However, it is my purpose to run much higher compression than that of the usual gasoline semi-Diesel injection engine, wherein the mixture is injected into the cylinder at the beginning of the compression stroke. Under average running conditions, the compression in the main combustion chamber of my engine will reach about 150 pounds, as compared to a pressure of 400 to 600 pounds in a true Diesel. Pre-ignition does not occur, however, for two reasons. Injection of the main power charge does not take place until the piston is within 20° of top dead center, so that by the time the mixture is in a combustible state, it is time for the ignition. The ports 15 and 12 are so highly restricted that the carburetted mixture in the pocket 16 can never be compressed sufficiently to cause self-ignition.

It is also my desire not to completely throttle or shut off the air by the throttle valve 39. This valve may be smaller than the inside diameter of the pipe 38, so that when it is moved to a closed position to idle the engine, a considerable amount of air will pass into the cylinder when operating at idle or light loads. This will give higher compression under these conditions than in the usual electrically ignited engine, thereby giving more economy. As explained, a considerable amount of air may be admitted to the main combustion chamber without danger of its commingling with the mixture in the ignition chamber 16.

In the usual semi-Diesel engine, compression cannot be run very high because the cylinder is full of mixture when the spark occurs, so that it tends to explode instantaneously and to detonate badly, but in my engine a much higher compression may be used, because the main combustion chamber contains nothing but air during the greater part of the compression stroke. The greater part of the fuel is injected into the cylinder during the first part of the power stroke and not before the beginning of the power stroke, so that the entire combustion does not occur instantaneously and detonation is avoided. Even though ignition should occur as soon as injection starts into the pocket 13, as in Diesel practice, it would not be detrimental because this would happen only when the throttle was open wide enough to cause the compression to be high enough in the main combustion chamber and the pocket 13 to cause self-ignition when the injection started. This would advance the ignition slightly in advance of the spark ignition, but only under the conditions explained.

It might be though that the easily ignited mixture in the ignition pocket 16 would self-ignite before the spark occurs on the compression stroke, due to the fact that the compression in my engine is very high, but this is not the case because the restrictions 12 and 15 are of such sizes, as compared to the ignition pocket 16, that the compression in the latter will never have time to reach the pressure that is produced in the main combustion chamber. In the event that self-ignition should take place in the pocket 13, it will occur only a few degrees in advance of the spark ignition, because it cannot occur in this pocket until injection starts, and injection starts only a few degrees before the spark occurs.

It will also be noted that the crank shaft 8 is indicated as rotating in a clockwise direction and that the cylinder 5 is offset to the left so that its axis, if prolonged, would be to the left of the crank shaft. This feature also tends to eliminate detonation. For example, after the crank passes top dead center, the piston moves downwardly more rapidly than it would if located directly over the crank shaft axis. This causes a more rapid expansion in the volume of the combustion chamber during the early part of the power stroke. At the time when the charge is ignited in the chamber 16 and surges into the main combustion chamber 11, the burning is extremely rapid, but the piston moves downwardly so rapidly, or increases the volume of the chamber 11 so rapidly, that the rate of burning decreases slightly. In other words, by offsetting the cylinder to the left of a crank shaft that rotates in a clockwise direction, the increase in volume of the combustion chamber, as compared to the degrees of crank shaft rotation, will be very rapid at the beginning of the power stroke, but it will not increase so rapidly during the latter part of the stroke. In connection with the present invention, this offsetting of the cylinder is desirable.

In the operation of this engine, the spark should always be timed to occur when the injection starts, or shortly thereafter. This timing, in conjunction with the injection pocket connected by a highly restricted port to the main combustion chamber, causes the combustion to be progressive rather than instantaneous. This is essential in eliminating detonation. Incidentally, the flame from the ignition pocket 16 will always keep the injection pocket 13 hot, even when the engine is running under a light load. Even though a very small charge is injected into the pocket 13 for a light load, it will be ignited and blown at a high velocity into the main combustion chamber 11 by the explosion of the electrically ignited charge. For idling, no liquid fuel is injected into the pocket 13. The engine idles on carburetted fuel alone, which is electrically ignited. As the throttle valves are opened, injection of liquid fuel is begun and the power increases.

It is to be understood that the invention is not limited to the precise structure shown and described, but also includes such modifications as may be embraced within the scope of the appended claim.

Having thus described the invention, what I claim as new and desire to secure by Letters Patent, is:

An internal combustion engine comprising a cylinder, a piston reciprocable therein, a main combustion chamber, an injection pocket having a restricted communication with the main combustion chamber, means for injecting fuel into the injection pocket, a primary combustion pocket having a restricted communication with the injection pocket, electrical ignition means for said primary combustion pocket, a valve controlled port at the top of said primary combustion pocket, means including a carbureter for delivering a carburetted combustible mixture of air and fuel through said intake port into the primary combustion pocket, and a valve controlled air inlet for the main combustion chamber, the said valve controlled port for the primary combustion pocket being open on the suction stroke of the piston whereby the exhaust gases in the primary combustion pocket and injection pocket are drawn out of the said pockets on the intake stroke and a fresh charge of fuel and air drawn into the primary combustion chamber.

MARION MALLORY.